United States Patent
Perlsweig

(10) Patent No.: US 6,361,174 B2
(45) Date of Patent: *Mar. 26, 2002

(54) HIGHWAY TRAFFIC WARNING REFLECTOR

(76) Inventor: Leon Perlsweig, 23017 Gainford St., Woodland Hills, CA (US) 91364

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/273,906

(22) Filed: Mar. 22, 1999

(51) Int. Cl.$^7$ .............................. G02B 5/12; E01F 9/00
(52) U.S. Cl. ...................... 359/553; 359/551; 359/552; 116/638
(58) Field of Search ................... 359/515, 532, 359/531, 547, 551, 552, 553; 404/9, 12; 116/63 R, 63 P, 63 C, 63 T; 383/6; 108/28, 26, 29; 248/158

(56) References Cited

U.S. PATENT DOCUMENTS

| | | | | |
|---|---|---|---|---|
| 3,520,235 A | * | 7/1970 | Palazzolo et al. | 116/63 R |
| 3,775,887 A | * | 12/1973 | Precourt | 116/63 P |
| 4,157,134 A | * | 6/1979 | Stoll | 190/1 |
| 4,296,693 A | * | 10/1981 | Archer | 108/28 |
| 4,317,617 A | * | 3/1982 | Charlton | 359/553 |
| 4,402,439 A | * | 9/1983 | Brown | 224/32 R |

OTHER PUBLICATIONS

Neufeldt, Victoria. Webster's New World Dictionary Third College Edition. Simon & Schuster, Inc. p. 977, Dec. 1988.*
Neufeldt, Victoria. Webster's New World Dictionary Third College Edition. Simon & Shuster, Inc. p. 102, Dec. 1988.*

* cited by examiner

Primary Examiner—Audrey Chang
Assistant Examiner—Jennifer Winstedt
(74) Attorney, Agent, or Firm—Baker Botts L.L.P.

(57) ABSTRACT

A highway traffic warning reflector comprises a conventional collapsible shopping bag having highly reflective outer surfaces and support means for maintaining the bag upright when opened and placed with its bottom on the ground adjacent a roadway. The support means includes a rigid rod and weight formed with an opening to receive one end of the rod, and a loop formed adjacent a corner of the bag near its upper open end. To set up the reflector, the bag is opened from its collapsed state, the weight placed in a corner at the bottom of the bag and the rod inserted through the loop and into the opening in the weight. In lieu of a separate rod, stiffening means may be incorporated in the bag structure. One or more support means may be used to maintain the reflective bag upright adjacent a roadway in fall view of oncoming vehicles against wind and turbulence caused by passing vehicles.

1 Claim, 3 Drawing Sheets

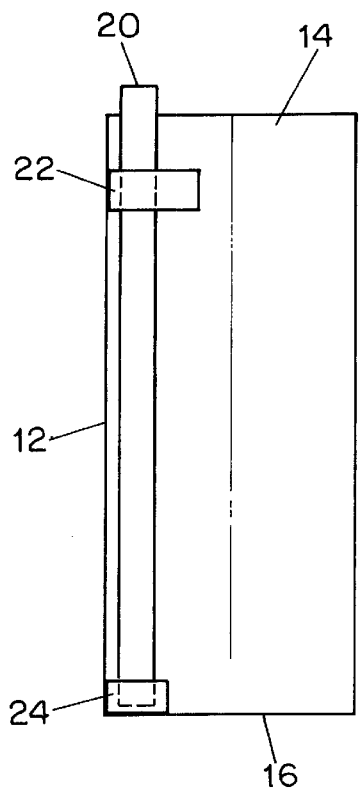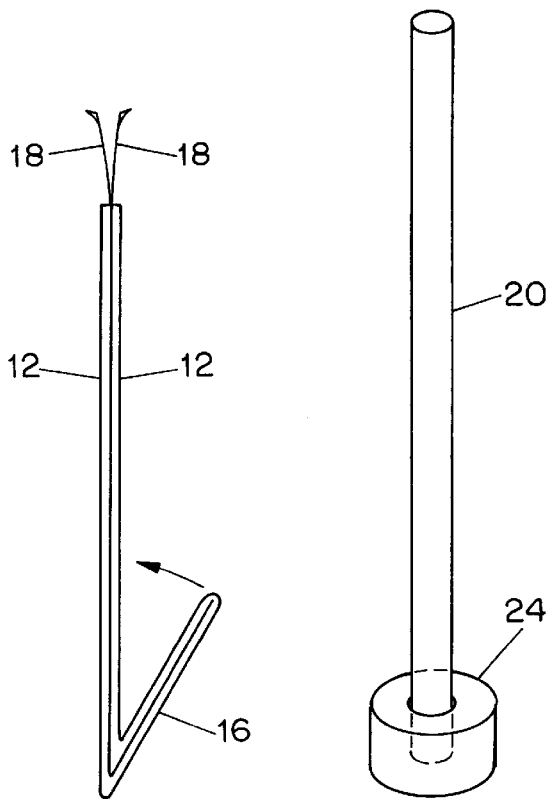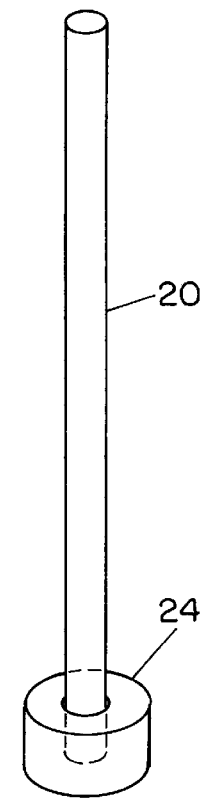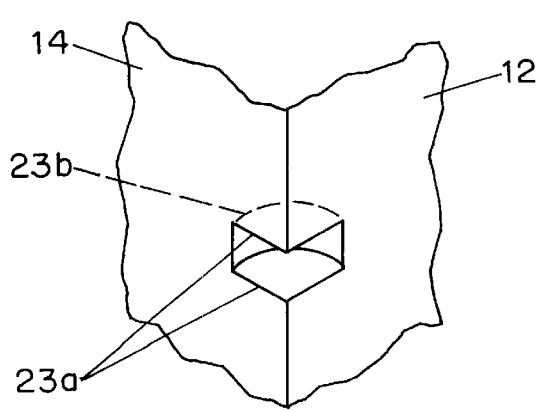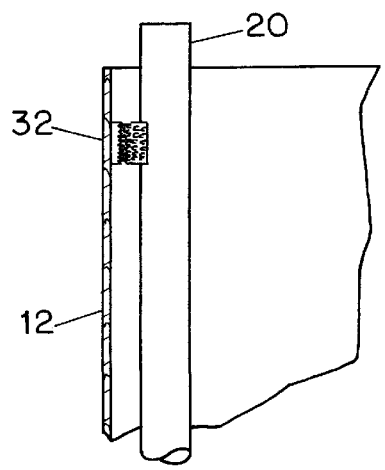
FIG. 2     FIG. 3     FIG. 4
FIG. 5     FIG. 6

HIGHWAY TRAFFIC WARNING REFLECTOR

FIELD OF THE INVENTION

The present invention relates to highway traffic warning reflectors used by motorists to warn oncoming cars and trucks of the presence of their stopped vehicle on or alongside a roadway. More particularly, the present invention provides a simple, inexpensive reflective warning device for use by a stalled motorist.

BACKGROUND OF INVENTION

Stationary vehicles on or alongside a roadway present a major traffic hazard, especially after dark. The vehicles may be highway work trucks used by road crews for highway maintenance, police cruisers aiding stalled motorists and motorists who stop on the highway or on the highway shoulder for various reasons. At night, especially on unlit roads and highways, the drivers of traveling vehicles have great difficulty in seeing the stopped vehicle and recognizing that it is not moving, even if the stopped vehicle's taillights are flashing. On curving highways especially, it is difficult to perceive whether a vehicle is stopped in a driving lane or off on a shoulder until the approaching vehicle is dangerously close.

Recognizing the dangers inherent in stopping a vehicle on or alongside a roadway, experienced drivers such as truckers, road maintenance crews and policemen, typically carry devices to deploy behind a stopped vehicle to warn oncoming drivers. Expedients such as flares and reflective cones or triangular pyramids are in common use. While these devices are effective to warn oncoming drivers, they are relatively expensive, bulky to carry and, in the case of flares, not reusable. Moreover, if they are hit by an oncoming vehicle, they can cause damage to vehicles and injury to people who may be in the vicinity of the stalled vehicle.

BRIEF SUMMARY OF THE INVENTION

It is the object of this invention to provide a highway warning device that is safe, effective, simple to deploy, reusable and inexpensive.

A further object of the invention is to provide such a device which is collapsible and requires little storage space when undeployed.

The invention comprises a collapsible, folding structure essentially in the form of a conventional paper shopping bag having a highly reflective exterior surface and support means for maintaining the bag in an open, upright position against wind and turbulence from passing vehicles. The support means may consist of one or more weights placed inside the open bag at its bottom and a cooperating rod or stick extending vertically from each weight to keep the bag from collapsing. A loop or other retaining means may be provided along the interior wall of the bag to secure the rod in its vertical position. The rod thus serves to maintain the bag upright and in its open condition. In lieu of a separate rod, the stiffening means may be incorporated in the bag structure itself In its collapsed, stored condition, the bag itself is folded flat, in the manner of a typical shopping bag, with weights and rods kept in a separate container. The small volume occupied by the device in its undeployed state allows a number of them to be easily carried in the trunk of a police cruiser or civilian automobile.

The exterior surface of the collapsible bag is highly reflective at least in part, and may be imprinted with a suitable warning message. The reflective surface may be provided by use of a white pigmented paper or by an appropriate reflective or night-glow coating applied to the paper. In addition to serving as a highway warning device, the reflective bag, without the support means, may be carried by pedestrians walking after dark, to increase their visibility to motorists. This would be particularly useful to children making their "trick or treat" rounds on Halloween.

BRIEF DESCRIPTION OF THE DRAWINGS

The foregoing objects, features and advantages of the invention will become readily apparent from the following detailed description, when taken in conjunction with the appended drawings, in which:

FIG. 2 is a cross-section through the device of the invention taken along the lines 2—2 of FIG. 1;

FIG. 3 is an end view of the collapsible bag of the invention in fully collapsed condition;

FIG. 4 illustrates the retaining means of the invention;

FIG. 5 is a partial section of the collapsible bag of the invention showing an alternate way of forming an interior loop;

FIG. 6 illustrates in partial section a modification of the support means of the invention.

DETAILED DESCRIPTION OF THE INVENTION

Figure 1:
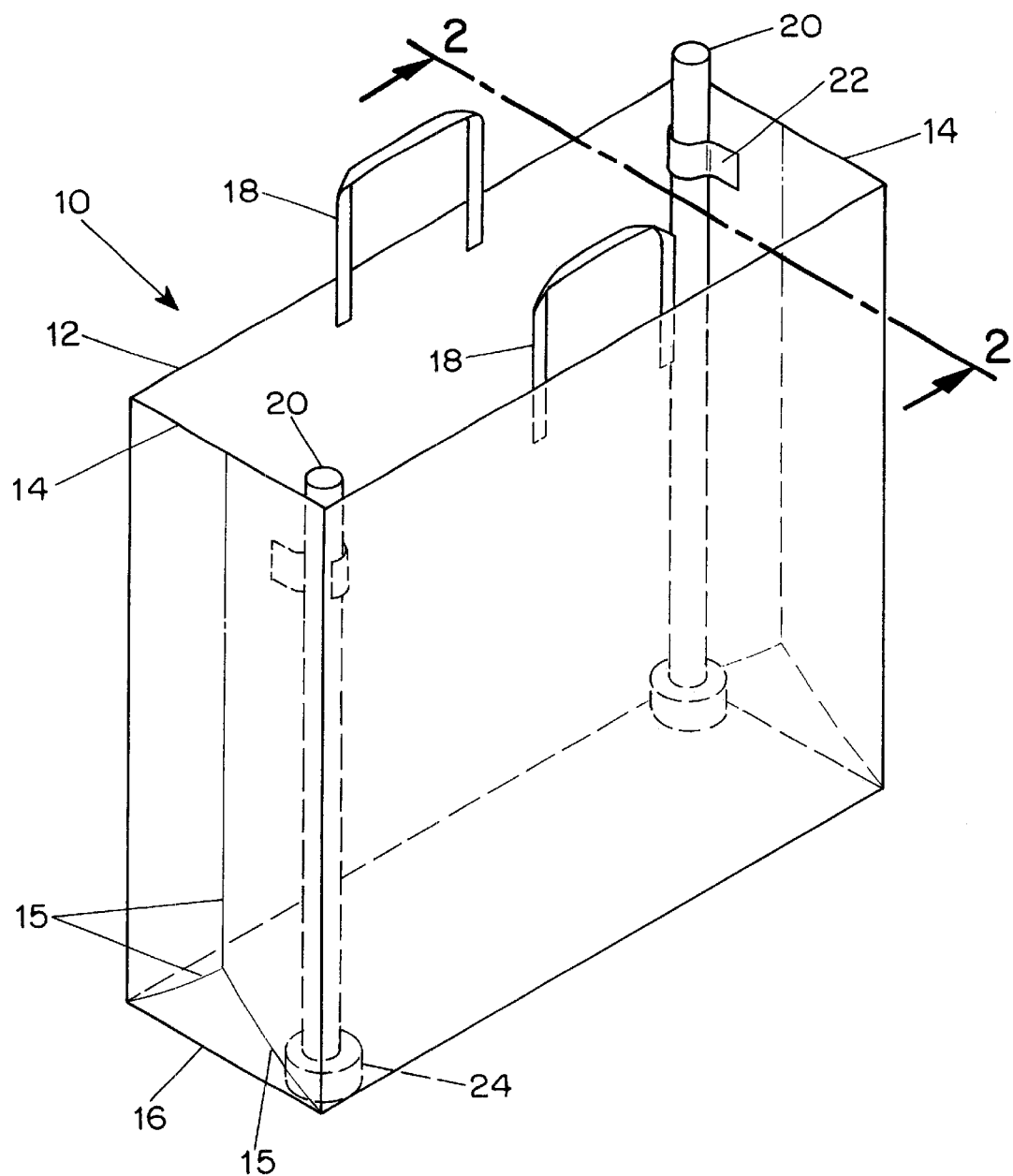
FIG. 1 illustrates the warning device of the invention in fully deployed position with the collapsible bag fully open and support means in place.

Referring now to FIG. 1, the numeral 10 denotes a conventional shopping bag having its side walls 12, end walls 14, a bottom panel 16, and handles 18. The latter may be paper strips glued to the inner surfaces of the side walls, loops of tubular material or yarn secured under an edge fold, or any other appropriate expedient known in the art.

The bag 10 may be easily collapsed, in known fashion, by folding along the line 15 in the end walls 14 and lines (not shown) in one of the side walls 12. The collapsed bag is illustrated in FIG. 3.

Typically, the type of shopping bag illustrated, whether made of kraft paper commonly used in grocery stores or heavier paper used by department stores and specialty shops, when opened, can stand upright on its base without additional support. However, the slightest touch or air current will cause it to fall over.

In accordance with the present invention, support or stiffening means are provided to enable an opened shopping bag of the type shown to remain in an upright position against wind and turbulence caused by passing vehicles. Turning particularly to FIGS. 1, 2, and 3, the support means comprises an elongated rod or stick 20 and weight 24, the latter resting on the bottom of the bag adjacent the side and/or end wall of the bag. The weight 24 is provided with a central opening to receive an end of the rod 20 with sufficient play to permit ready removal of the rod.

The rod may be made of any suitable inexpensive material, such as wood or plastic or may simply be a length of pipe. Similarly, the weight 24 may be fabricated from an inexpensive material such as pot metal (a mixture of copper and lead) or any other material that provides the requisite weight in a small volume and which can be readily formed to receive the rod 20. Although shown as cylindrical, the weight 24 may be rectangular or any other suitable shape.

Fastened to the interior of the bag 10, in one or more corners and near the upper edge, is a loop 22, preferably of the same material as the bag itself. As shown in FIG. 1, the loop 22 has on end glued or otherwise fastened at one end to the interior surface of a side wall 12 of the bag and at the other end to the interior surface of an end wall 14. Alternatively, as show in FIG. 5, an interior loop may be formed by making a pair of horizontal spaced cuts 23a in the corner of the bag to create a strip that may be pushed inwardly to provide the interior loop 23b.

To install the support means in the opened bag, the weight 24 is first placed inside the bag at a bottom corner below the loop. The rod 20 is then inserted through the loop 22 (or 23b) and into the central opening of the weight 24.

Preferably, two sets of support means 20, 24 and a pair of loops 22 are provided in opposite corners of the bag to insure its ability to withstand air movement, but 1 to 4 sets may be provided as desired.

To provide the necessary night visibility, the paper used for the bag may have a bright, white pigment with suitable reflective characteristics. Alternatively, the bag walls may be coated with reflective or luminescent inks or paints of suitable night glow colors. It is sufficient that the outer surface of only one sidewall of the bag have a reflective surface, that surface facing oncoming traffic when the device is deployed. However, all outer surfaces of the bag may be made reflective, if desired.

As will be appreciated, one or more warning reflectors according to the invention may be set up along the roadway at a sufficient distance behind the stopped vehicle, with their reflective surfaces facing oncoming traffic, to give approaching motorists adequate notice of the presence of the stopped vehicle. The small space needed to store the bags and support means components permit a vehicle to carry a number of them and thus to deploy several of them behind the vehicle to insure adequate warning.

FIG. 6 illustrates an alternative to the loops 22, 23b used to retain the rods 20 in vertical position. A segment of releasable loop and hook connector, known by the trademark Velcro®, has one element fastened to the interior surface of the bag along the wall 12 and the mating element fixed to the rod 20 at the appropriate distance from the upper end. After inserting the other end of the rod into the weight 24, the upper end of the rod is moved toward the bag to join the elements of the closure segment 32.

Figure 7:
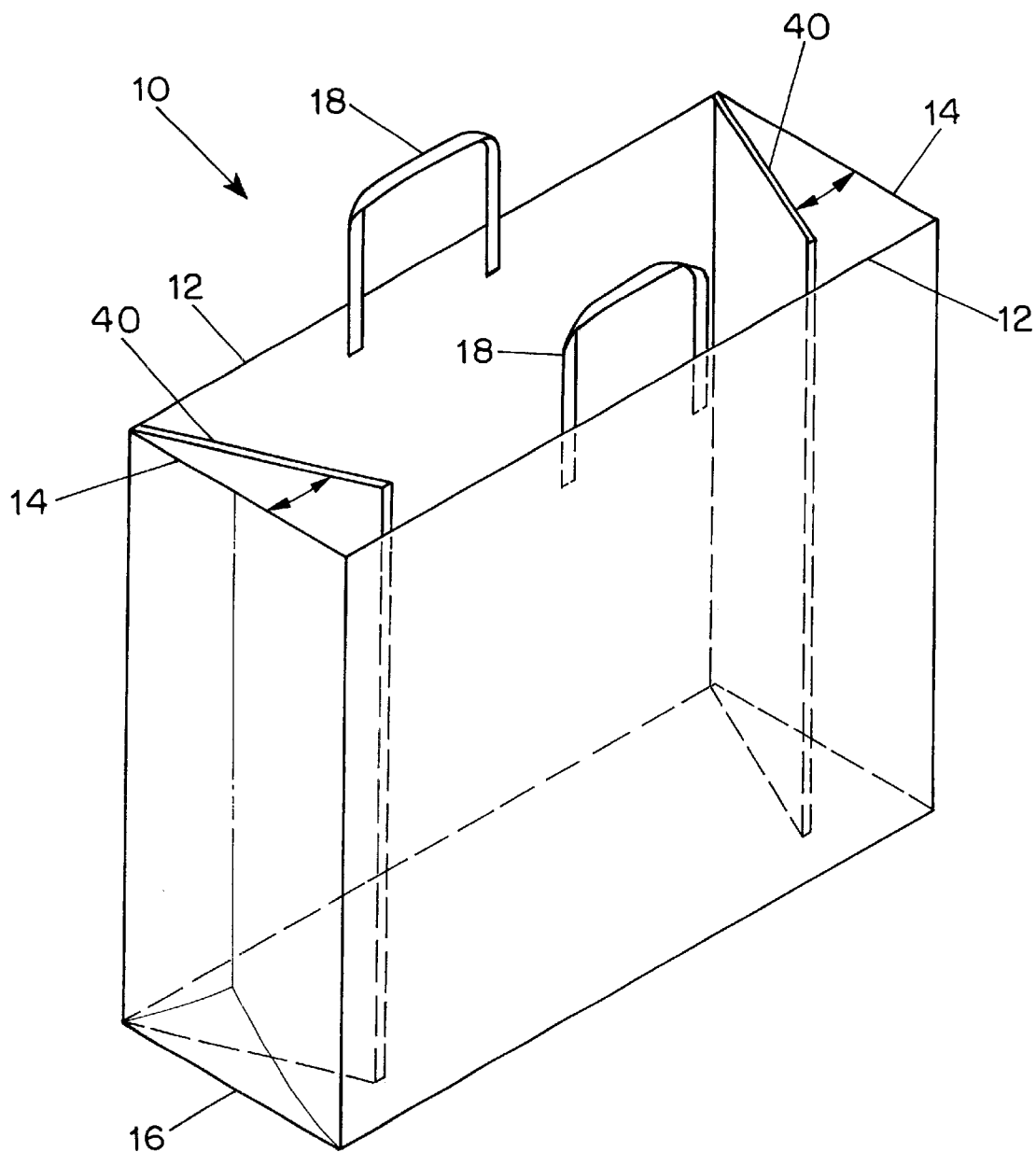
FIG. 7 is a perspective view of the bag of the invention illustrating an alternative type of stiffening means.

A substitute for the rods 20 may be provided by incorporating stiffening means as part of the bag itself. As illustrated in FIG. 7, stiff heavyweight paperboard flaps 40 of substantially the same dimensions as the end walls 14 may be joined to the interior corners of side walls 12 of the bag 10 where they meet end walls 14. The flap 40 is joined to the corner by a flexible strip, such as of tape or paper so that the flap may be moved against the side wall when the bag is to be collapsed and against the end wall when the bag is to be deployed, as shown by the arrows. One or two flaps 40 may be used, as desired, and a weight or weights 24 (not shown in FIG. 7) are inserted in the bag when deployed.

Although primarily intended as a highway warning reflector, the bag 10 may serve other uses requiring its reflective properties, as well. For example, without the support means, the bag itself will provide increased visibility after dark to pedestrians, such as children trick or treating, as noted above, or others simply walking home from the neighborhood grocery store.

It will be understood that other variations and modifications of the invention will occur to those skilled in the art and the scope of the invention is to be limited only as set forth in the appended claims.

I claim:

1. A reusable highway warning reflector comprising:
 a collapsible bag providing, when opened, a four-sided structure having a pair of side walls, a pair of end walls joined to respective edges of said side walls, a flat bottom panel and an open top, at least one of said side walls having a highly reflective outer surface, and
 support means for maintaining said bag in an upright position when opened with its bottom panel resting on the ground, said supporting means comprising:
  a weight insertable within said open bag to rest on the interior surface of said bottom panel adjacent one of said walls of said bag,
  an elongated rigid rod slightly longer than the height of said open bag having one end adapted to releasably engage said weight, and
  a retainer in the interior of said bag for holding said rod in a substantially vertical orientation comprising a loop formed by a pair of limited length parallel cuts made in side end walls at a corner of said bag, the length of said cuts being such as to provide an inwardly extending loop having an opening through which said rod is passed.

* * * * *